United States Patent
Lin

(10) Patent No.: US 9,152,029 B2
(45) Date of Patent: Oct. 6, 2015

(54) OPTICAL MODULE FOR USE IN A PROJECTOR APPARATUS AND PROJECTOR APPARATUS

(75) Inventor: Hung Ying Lin, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 397 days.

(21) Appl. No.: 13/535,402

(22) Filed: Jun. 28, 2012

(65) Prior Publication Data

US 2013/0258292 A1 Oct. 3, 2013

(30) Foreign Application Priority Data

Mar. 27, 2012 (TW) .............................. 101110459 A

(51) Int. Cl.
G03B 21/20 (2006.01)
G03B 33/08 (2006.01)

(52) U.S. Cl.
CPC .......... *G03B 21/204* (2013.01); *G03B 21/2066* (2013.01); *G03B 33/08* (2013.01)

(58) Field of Classification Search
CPC . G03B 21/204; F21V 13/08; G02B 2207/113
USPC ....................... 353/85, 84, 98, 99, 30, 31, 94; 359/885–892; 313/501; 362/84; 250/484.2, 484.4
See application file for complete search history.

(56) References Cited

U.S. PATENT DOCUMENTS

| | | | |
|---|---|---|---|
| 2008/0055401 A1 | 3/2008 | Decusatis et al. | |
| 2009/0316114 A1* | 12/2009 | Richards | 353/7 |
| 2011/0002489 A1 | 1/2011 | Schefer | |
| 2011/0254918 A1 | 10/2011 | Chou | |
| 2012/0206900 A1* | 8/2012 | Yang et al. | 362/84 |
| 2013/0100644 A1* | 4/2013 | Hu et al. | 362/84 |

FOREIGN PATENT DOCUMENTS

CN 101986204 3/2011

* cited by examiner

*Primary Examiner* — William C Dowling
*Assistant Examiner* — Ryan Howard
(74) *Attorney, Agent, or Firm* — Muncy, Geissler, Olds & Lowe, P.C.

(57) ABSTRACT

An optical module includes a curved reflecting component, a first filtering component, a second filtering component and a rolling component. The curved reflecting component has a focus, a transmissive portion, a first reflecting portion and a second reflecting portion. The rolling component includes a first transforming portion and a second transforming portion. The first waveband light is transmitted into the transmissive portion and is then transformed into a second waveband light via the first transforming portion. The second waveband light is subsequently transformed into a first emergent light. The first waveband light is transmitted into the transmissive portion and is then transformed into the second waveband light via the second transforming portion. The second waveband light is subsequently transformed into a second emergent light.

12 Claims, 3 Drawing Sheets

OPTICAL MODULE FOR USE IN A PROJECTOR APPARATUS AND PROJECTOR APPARATUS

This application claims priority to Taiwan Patent Application No. 101110459 filed on Mar. 27, 2012.

CROSS-REFERENCES TO RELATED APPLICATIONS

Not applicable.

BACKGROUND OF THE INVENTION

1. Field of the Invention

The present invention provides an optical module and a projector apparatus comprising the same, and more particularly, to an optical module and a three-dimensional (3D) projector apparatus that use a curved reflecting component to simplify the optical path structure and to reduce the cost.

2. Descriptions of the Related Art

Solid-state light sources such as light emitting diodes (LEDs) and laser diodes (LDs) have advantages of a long service life, a small volume and being mercury-free. However, the brightness of these solid-state light sources is still much lower than that of conventional high-pressure mercury lamps when they are used as light sources in projector apparatuses. Therefore, although the use of the solid-state light sources have become very popular, they have not completely replaced conventional high-pressure mercury lamps in projector apparatuses.

On the other hand, for a light source in a projector apparatus to emit light of the three primary colors (i.e., red, blue and green) so that light coupling can be accomplished by a light coupling assembly disposed in the projector apparatus, the following two ways are usually adopted in the prior art to output the light of the three primary colors: in the first way, a solid-state light source is used to emit a white light, then the white light propagates through a color wheel with a red region, a blue region and a green region to be transformed into a red light, a blue light and a green light respectively in different time periods, and finally the red light, the blue light and the green light are coupled for output. In the second way, a blue laser as a solid-state light source is used to excite phosphors coated on a rotary wheel to generate a red light, a blue light, and a green light or a yellow light, and then the blue light from the blue laser is coupled with the red light, the green light or the yellow light to obtain the desired image.

However, although both ways can use a light beam emitted by a solid-state light source to generate a red light, a blue light, a green light or a yellow light to achieve light coupling, they have a low efficiency and can only provide relatively divergent light rays due to limitations of the inherent optical properties of the light source. Particularly, to split the light to obtain a stereoscopic image in a single projector apparatus, a rotary filtering wheel and a color wheel are rotated synchronously to provide split images of different wavelengths to the left eye and the right eye respectively. Then, the left-eye image received by the left eye and the right-eye image received by the right eye are combined into a stereoscopic image.

However, it is difficult for the rotary filtering wheel of conventional stereoscopic imaging technologies to rotate completely synchronously with the color wheel in terms of both the rotation speed and the rotation angle. Accordingly, it is important to solve the problem of asynchronism between the rotary filtering wheel and the color wheel.

SUMMARY OF THE INVENTION

An objective of the present invention is to provide an optical module and a projection apparatus. The optical module and the projection apparatus use a curved reflecting component to simplify the light path structure and can eliminate asynchronism between the left-eye image and the right-eye image and reduce the cost.

To achieve the aforesaid objective, the optical module of the present invention comprises a curved reflecting component, a first filtering component, a second filtering component and a rolling component. The curved reflecting component has a focus, a transmissive portion, a first reflecting portion and a second reflecting portion. The transmissive portion is disposed on the first reflecting portion. The second filtering component is disposed on the side of the first filtering component. The rolling component includes a first transforming portion and a second transforming portion, each of which comprises a wavelength transforming unit. The first transforming portion and the second transforming portion independently pass through the focus in a first period and a second period respectively. In the first period, the first waveband light transmits into the transmissive portion and is then transformed into a second waveband light via the first transforming portion. The second waveband light is transformed into a first emergent light via the second reflecting portion and the first filtering component. In the second period, the first waveband light is transmitted into the transmissive portion and is then transformed into the second waveband light via the second transforming portion. The second waveband light is transformed into a second emergent light via the first reflecting portion and the second filtering component.

To achieve the aforesaid objective, the projector apparatus comprises the following: at least one first light source for providing a first waveband light; at least one second light source for providing a third waveband light; the aforesaid optical module for transforming the second waveband light into the first emergent light reversely shifted by a predetermined wavelength and transforming the second waveband light into the second emergent light forwardly shifted by the predetermined wavelength; and a light uniformizing component for uniformizing the third waveband light, the first emergent light and the second emergent light, and for transmitting the first emergent light and the second emergent light via an optical modulator and a lens set in sequence.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
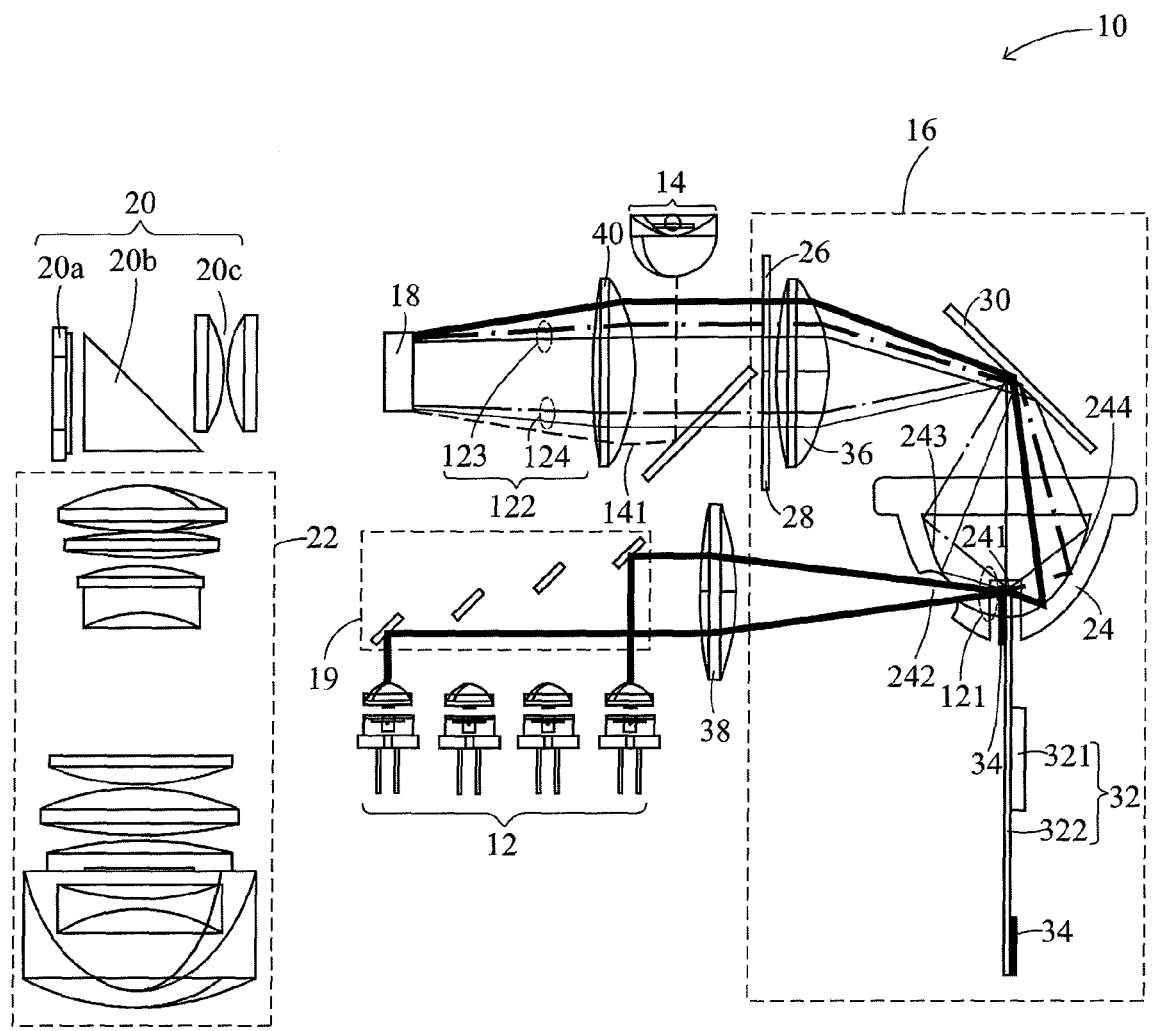
FIG. 1 is a schematic view of a projector apparatus according to an embodiment of the present invention.

FIG. 1 illustrates a schematic view of a projector apparatus 10 according to an embodiment of the present invention. The projector apparatus 10 comprises a first light source 12, a second light source 14, an optical module 16, a light uniformizing component 18, a mirror module 19, an optical modulator 20 and a lens set 22.

A laser light emitted from the first light source 12 is reflected by the mirror module 19 to a second collecting component 38 to be collected into the first waveband light 121. The mirror module 19 comprises at least one mirror corresponding to the first light source 12. In the first time period, the optical module 16 transforms the first waveband light 121 into a second waveband light 122, and reversely shifts the second waveband light 122 by a predetermined wavelength W to obtain the first emergent light 123. In the second time period, the optical module 16 forwardly shifts the second waveband light 122 by the predetermined wavelength W to obtain a second emergent light 124. Thereby, the first emergent light 123 and the second emergent light 124 can be distinguished as a left-eye image and a right-eye image according to a time sequence, and then the left-eye image and the right-eye image are outputted through the optical modulator 20 and the lens set 22 so that a viewer can watch a stereoscopic image by means of a pair of 3D glasses.

The second light source 14 is adapted to provide a third waveband light 141 to complement the brightness and the color chrominance which the first waveband light 121 lacks. For example, the first light source 12 is a short-wave blue light emitter, while the optical module 16 is adapted to excite the blue light into a green light, a red light and a yellow light respectively. Therefore, the second light source 14 may be a long-wave blue light emitter adapted to complement a blue light waveband which the light generated by the optical module 16 from the first waveband light 121 lacks.

The light uniformizing component 18 is adapted to uniformize the first emergent light 123, the second emergent light 124 and the third waveband light 141. The first emergent light 123, the second emergent light 124 and the third waveband light 141 that are uniformized are then outputted through the optical modulator 20 and the lens set 22 to form a stereoscopic image with complete color information. The light uniformizing component 18 may be an array lens or a fly lens. In this embodiment, the optical modulator 20 comprises a digital micromirror device 20a (DMD) which can be replaced by a liquid crystal displaying (LCD) device; however, at least one triangular prism 20b or a lens set 20c may also be used in other preferred embodiments, and the present invention is not merely limited to this embodiment.

The optical module 16 comprises a curved reflecting component 24, a first filtering component 26, a second filtering component 28, a reflecting component 30 and a rolling component 32. The curved reflecting component 24 has a focus 241, a transmissive portion 242, a first reflecting portion 243 and a second reflecting portion 244. The focus 241 is located between the first reflecting portion 243 and the second reflecting portion 244, while the transmissive portion 242 is disposed on the first reflecting portion 243. Therefore, the first waveband light 121 can propagate into the curved reflecting component 24 via the transmissive portion 242 and project onto the focus 241.

In detail, the rolling component 32 may consist of at least one rotary shaft 321 and a rotary wheel 322. To clearly illustrate the implementations of the rotary wheel 322, a schematic view of the rotary wheel 322 of the rolling component 32 according to the embodiment of the present invention is shown in FIG. 2.

Figure 2:
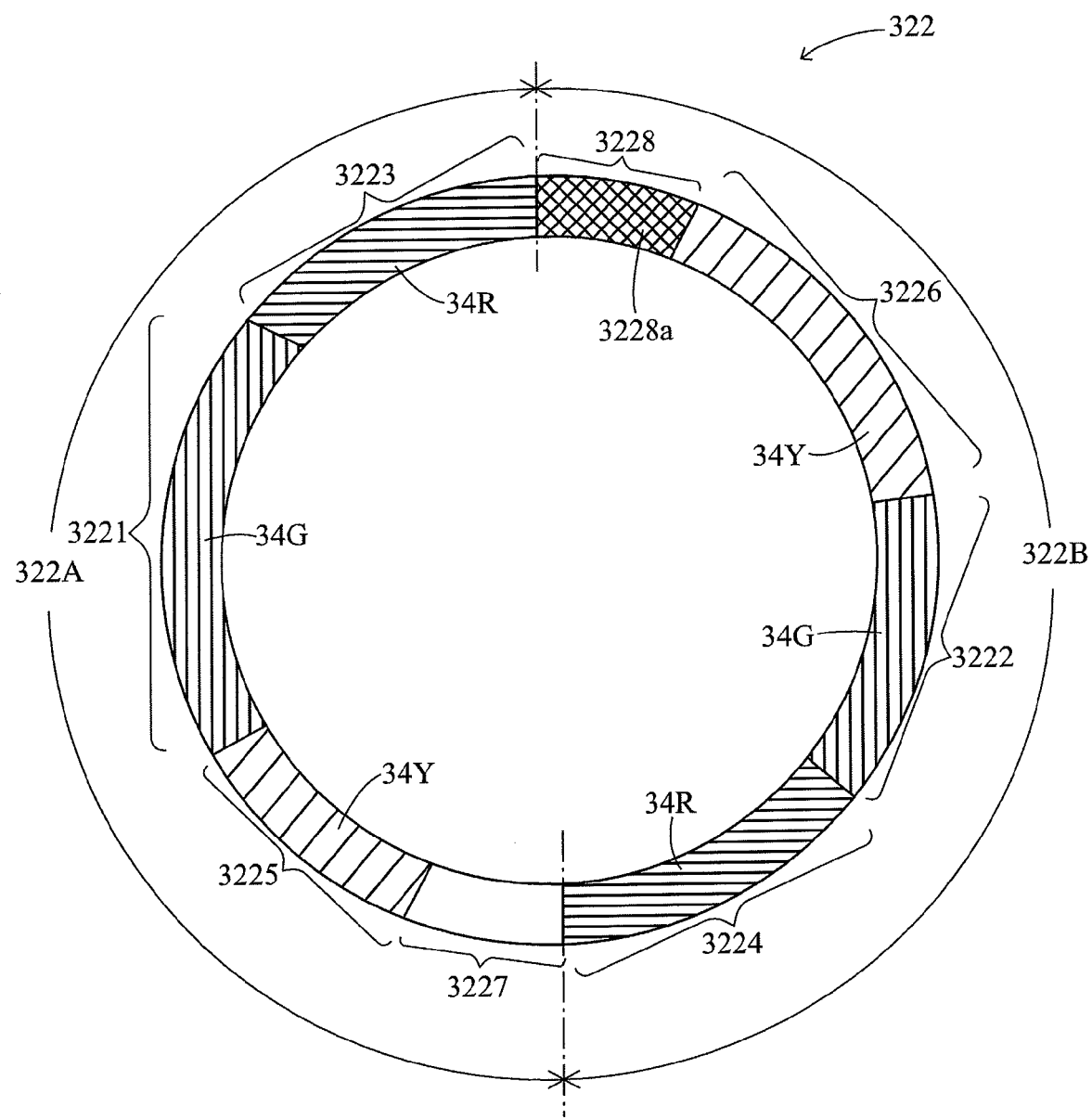
FIG. 2 is a schematic view of a rotary wheel of a rolling component in the embodiment of the present invention.

As shown in FIG. 1 and FIG. 2, the rotary wheel 322 is generally divided into two portions, i.e., a first transforming portion 322A disposed on the first surface (i.e., the front surface) of the rotary wheel 322 and a second transforming portion 322B disposed on the second surface (i.e., a back surface) of the rotary wheel 322. The first transforming portion 322A and the second transforming portion 322B each comprise a wavelength transforming unit 34, while the first transforming portion 322A and the second transforming portion 322B pass through the focus of the curved reflecting component in a first period and a second period respectively.

It shall be noted that only a part of the wavelength transforming unit 34 passing through the focus 241 and a portion of the wavelength transforming unit 34 of the other half are depicted in the embodiment of FIG. 1, with the other portions of the waveform transforming units 34 that are disposed on the rotary wheel 322 omitted from depiction for simplicity. However, this is not intended to limit the variations of the wavelength transforming units 34 on the rotary wheel 322 of the present invention.

Specifically, in this embodiment, the first transforming portion 322A comprises a first green transforming area 3221, a first red transforming area 3223, a first yellow transforming area 3225 and a transmissive area 3227. The second transforming portion 322B comprises a second green transforming area 3222, a second red transforming area 3224, a second yellow transforming area 3226 and a reflecting area 3228.

In detail, the wavelength transforming unit 34 may comprise wavelength transforming subunits 34G, 34R and 34Y. The six transforming areas 3221, 3222, 3223, 3224, 3225 and 3226 may each be provided with corresponding wavelength transforming subunits 34G, 34R and 34Y respectively, e.g., a green phosphor, a red phosphor and a yellow phosphor. In contrast, the transmissive area 3227 and the reflecting area 3228 are not provided with any wavelength transforming subunits. As the rotary wheel 322 rotates, the individual transforming areas pass through the focus 241 of the curved reflecting component 24 in sequence in respective time periods so that the first waveband light 121 can pass through the transmissive portion 242 to excite the wavelength transforming subunits 34R, 34G and 34Y on the corresponding transforming region or pass through the transmissive area 3227 and the reflecting area 3228 to form a second waveband light 122.

Furthermore, when the wavelength transforming subunit 34R is excited by the first waveband light 121 in a time period, the second waveband light 122 has a red wavelength; when the wavelength transforming subunit 34G is excited by the first waveband light 121 in another time period, the second waveband light 122 with the second wavelength has a green wavelength; and when the wavelength transforming subunit 34Y is excited by the first waveband light 121 in a further time period, the second waveband light 122 with the second wavelength has a yellow wavelength.

In this embodiment, the substrate of the rotary wheel 322 is made of a transparent medium and may be divided into a first surface (i.e., the front surface) and a second surface (i.e., the back surface). The back surface of the rotary wheel 332 is disposed adjacent to the transmissive portion 242 of the curved reflecting component 24. On the front surface of the rotary wheel 322 are disposed the first green transforming area 3221, the first red transforming area 3223, the first yellow transforming area 3225 and the transmissive area 3227. The first green transforming area 3221, the first red transforming area 3223 and the first yellow transforming area 3225 are coated with a green phosphor, a red phosphor and a yellow phosphor respectively, while the transmissive area 3227 is not coated with any material but is only a portion of the transparent substrate.

Therefore, the first waveband light 121 can be projected onto individual transforming areas (3221, 3223 and 3225) and the transmissive area 3227 of the first transforming portion 322A respectively to excite the wavelength transforming subunits (e.g., 34G, 34R and 34Y) on the individual transforming areas (3221, 3223 and 3225). As a result, the first waveband light 121 is transformed into a second waveband light 122, which then propagates through the first filtering component 26 to form a first emergent light 123. It shall be particularly appreciated that in this embodiment, the first waveband light 121 that transmits through the transmissive area 3227 can provide a light with a blue wavelength.

As an example, the two light rays generated in sequence when the wavelength transforming units 34 (e.g., wavelength transforming subunits 34G and 34R shown in FIG. 2) on the first green transforming area 3221 and the first red transforming area 3223 are excited by the first waveband light 121 according to a time sequence are depicted in FIG. 1. The two light rays are a second waveband light 122 with a green wavelength and a second waveband light 122 with a red wavelength respectively. The two light rays are then transformed into the first emergent light 123 in sequence.

As shown in FIG. 2, the second green transforming area 3222, the second red transforming area 3224, the second yellow transforming area 3226 and the reflecting area 3228 are disposed on the back surface of the rotary wheel 322. The second green transforming area 3222, the second red transforming area 3224 and the second yellow transforming area 3226 each have a mirror surface and are coated with a green phosphor, a red phosphor and a yellow phosphor respectively. The reflecting area 3228 only has a mirror surface 3228 but is not coated with any material.

Therefore, when the first waveband light 121 is projected onto the individual transforming areas (3222, 3224 and 3226) on the back surface of the rotary wheel 322, the first waveband light 121 is transformed into a second waveband light 122 by the wavelength transforming subunits 34G, 34R and 34Y respectively in sequence, and is then transformed into a second emergent light 124. The mirror surface 3228a of the reflecting area 3228 can reflect the first waveband light 121 with a blue wavelength from the reflecting area 3228 directly.

For example, the two light rays that are generated in sequence when the wavelength transforming units 34 (e.g., wavelength transforming subunits 34G and 34R) on the second green transforming area 3222 and the second red transforming area 3224 are excited by the first waveband light 121 according to a time sequence are depicted in FIG. 1. The two light rays are a second waveband light 122 with a green wavelength and a second waveband light 122 with a red wavelength respectively. The two light rays are then transformed into the second emergent light 124 respectively in sequence via the second filtering component 28.

FIG. 1 illustrates the functions of individual optical components and optical paths of the optical module 16 in the projector apparatus 10. The optical module 16 further comprises a first collecting component 36, while the projector apparatus 10 further comprises a second collecting component 38 and a third collecting component 40. The first collecting component 36 is disposed between the reflecting component 30 and the first and second filtering components 26, 28. The second collecting component 38 is disposed between the first light source 12 and the curved reflecting component 24. The third collecting component 40 is disposed between the light uniformizing component 18 and the first and second filtering components 26, 28. The collecting components (36, 38 and 40) extend the optical path to facilitate effective propagation of light of different wavelengths between the optical components.

As shown in FIGS. 1 and 2, the first waveband light 121 (a short-wave blue light) emitted from the first light source 12 is collected by the second collecting component 38 and transmitted to the curved reflecting component 24 in the first time period, and is then projected through the transmissive portion 242 to the first transforming portion 322A located at the focus 241. By the wavelength transforming unit 34 (e.g., the wavelength transforming subunit 34G) disposed on the first green transforming area 3221 of the first transforming portion 322A, the first waveband light 121 may be transformed into a second waveband light 122 with a green wavelength, then, be transmitted through the rotary wheel 322 to the second reflecting portion 244, and be sequentially reflected by the second reflecting component 244 and the reflecting component 30 into the first filtering component 26. Meanwhile, by virtue of the waveband shifting property of the first filtering component 26, the second waveband light 122 is forwardly shifted by the predetermined wavelength W to be transformed into the first emergent light 123.

On the other hand, as the rolling component 32 rotates quickly, the first waveband light 121 is then projected onto the second green transforming area 3222 located at the focus 241 in the second time period. In this embodiment, the first green transforming area 3221 and the second green transforming area 3222 are disposed at opposite positions at the radial periphery of the rotary wheel 322, and are provided with wavelength transforming subunits of the same color (e.g., two wavelength transforming subunits 34G with a green phosphor disposed thereon). The second green transforming area 3222 and the wavelength transforming subunit 34G thereof can transform the first waveband light 121 into a second waveband light 122 with a green wavelength. The second waveband light 122 with the green wavelength is reflected by the mirror surface of the rotary wheel 322 to the first reflecting portion 243 and is then sequentially reflected by the first reflecting portion 243 and the reflecting component 30 into the second filtering component 28. Then, by virtue of the waveband shifting property of the second filtering component 28, the second waveband light 122 is forwardly shifted by the predetermined wavelength W to be transformed into a second emergent light 124.

The reflecting component 30 may be disposed between the curved reflecting component 24 and the first and the second filtering components 26 and 28. The second filtering component 28 may be arranged on the side of the first filtering component 26 in parallel so that the first filtering component 26 and the second filtering component 28 can receive the second waveband light 122 in batches to form the first emergent light 123 and the second emergent light 124 that are reversely and forwardly shifted by the predetermined wavelength W respectively. The first collecting component 36 can stably transmit the second waveband light 122 from the reflecting component 30 to the first filtering component 26 and the second filtering component 28 respectively to form the first emergent light 123 and the second emergent light 124 respectively. The third collecting component 40 can stably transmit both the first emergent light 123 and the second emergent light 124, which are reversely and forwardly shifted respectively, as well as the third waveband light 141 from the second light source 14 to the light uniformizing component 18 so that the optical module 16 of the present invention can maintain the first emergent light 123, the second emergent light 124 and the third waveband light 141 propagating into the optical modulator 20 and the lens set 22 in a uniform traveling direction and at a uniform incident angle, thus resulting in a high-quality stereoscopic image.

Figure 3:
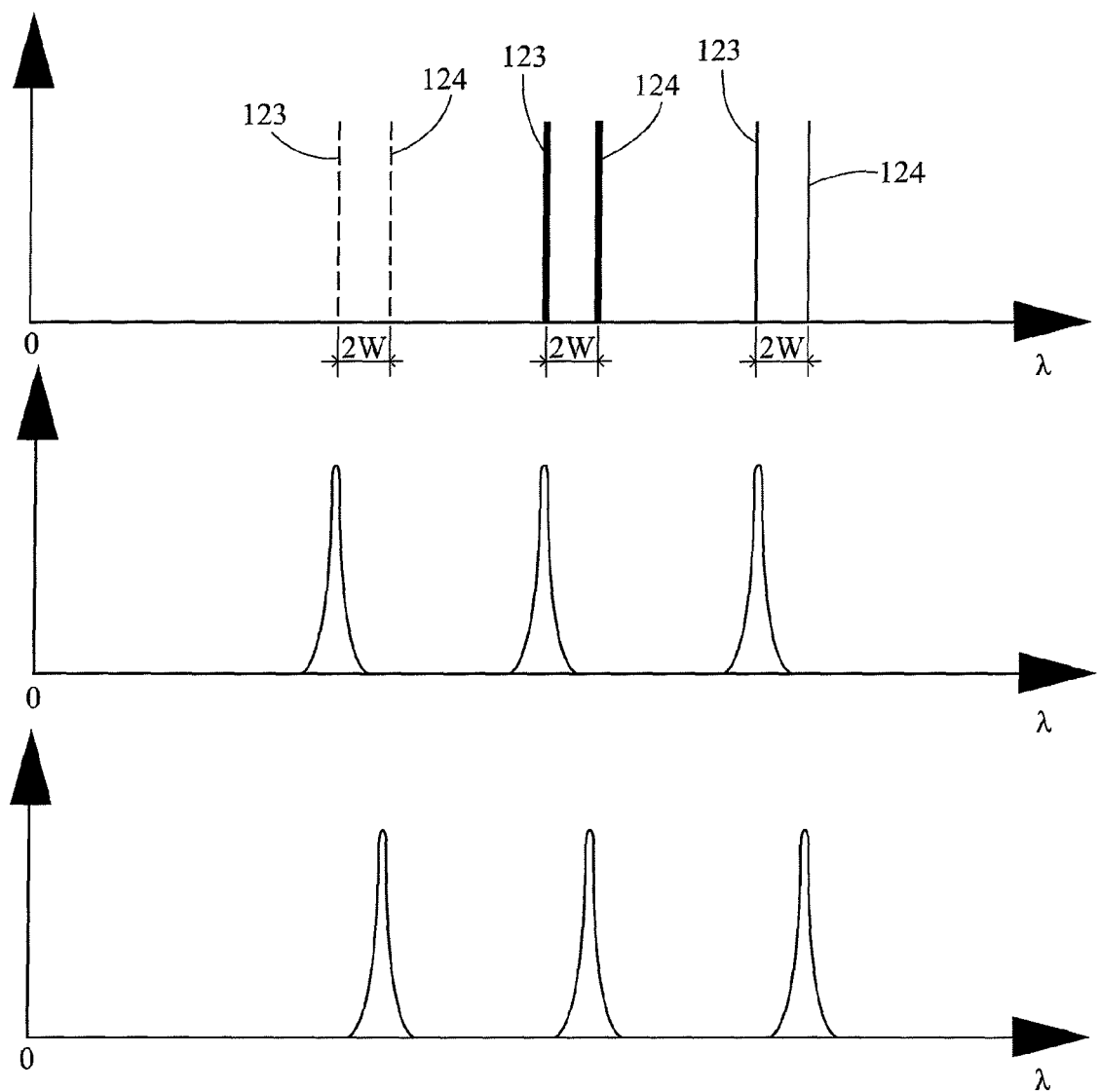
FIG. 3 is a diagram illustrating parts of the spectrums of a first emergent light and a second emergent light obtained by reversely and forwardly shifting a second waveband light by a predetermined wavelength W respectively according to the embodiment of the present invention.

FIG. 3 illustrates parts of the spectrums of the first emergent light 123 and the second emergent light 124 obtained by reversely and forwardly shifting the second waveband light 122 by the predetermined wavelength W respectively. Because the wavebands of the individual colors (e.g., the red color, the green color and the blue color) are relatively narrow as compared to the waveband range visible to human eyes, the optical module 16 of the present invention forms the first emergent light 123 and the second emergent light 124 by using the first filtering component 26 and the second filtering component 28 to reversely and forwardly shift (i.e., along the horizontal directions shown in FIG. 3) the second waveband light 122 with a green wavelength, a red wavelength or a yellow wavelength by the predetermined wavelength W. Thereby, the left-eye image and the right-eye image can be distinguished through the wavelength shifts by the viewer's left and right eyes while the primary colors of the image can still be maintained, thus, obtaining a stereoscopic image.

As shown in FIG. 3, a wavelength ($\lambda$) range of the red light is about 620-750 nm, a wavelength ($\lambda$) range of the green light is about 495-570 nm, and a wavelength ($\lambda$) range of the blue light is about 450-495 nm. The first filtering component 26 and the second filtering component 28 reversely and forwardly shift (i.e., increase or decrease) the wavebands of the first emergent light 123 and the second emergent light 124 of each color respectively, with average values of respective wavebands as midpoints. Thereby, the left-eye image and the right-eye image can be distinguished effectively while the primary colors are still maintained.

The curved reflecting component 24 may comprise a hyperboloid structure, e.g., first reflecting portion 243 and a second reflecting portion 244. The hyperboloid structure may be selectively an ellipse structure or a paraboloid structure. The wavelength transforming unit 34 (a phosphor material) may be disposed at the focus 241 of the hyperboloid structure. The optical module 16 transforms the first waveband light 121 into the first emergent light 123 and the second emergent light 124 in a first time period and a second time period respectively. Moreover, through the disposition of the first filtering component 26 and the second filtering component 28, the first emergent light 123 and the second emergent light 124 are reversely and forwardly shifted by the predetermined wavelength W with respect to the second waveband light 122 respectively to distinguish between the left-eye image and the right-eye image.

Furthermore, each of the wavelength transforming units 34 comprises only a green, a red and a yellow fluorescent material, so the third waveband light 141 is further emitted from the second light source 14 in a direction parallel to that of the first emergent light 123 and the second emergent light 124, as shown in FIG. 1. Thus, the light beam transmitted from the third collecting component 40 to the light uniformizing component 18 will comprise blue, green, yellow and red light, and the left-eye image and the right-eye image (i.e., the first emergent light 123 and the second emergent light 124 shifted by the predetermined wavelength W respectively, portions of which are depicted in FIG. 3) can be combined by the light uniformizing component 18, the optical modulator 20 and the lens set 22 into a stereoscopic image with complete color information.

According to the above descriptions, the optical module of the present invention projects the first waveband light (a short-wave blue light) into the first transforming portion and the second transforming portion of the rolling component in sequence, and through the rotation of the rolling component at a predetermined speed, different phosphors on the individual wavelength transforming units can be excited by the first waveband light to generate a plurality of second waveband lights (the green light, the yellow light and the red light) respectively. Depending on the design of the transparent medium of the rolling component and the mirror surface, the second waveband lights can propagate along the optical path of the optical module to the first filtering component and the second filtering component respectively where they are transformed into the first emergent light and the second emergent light that are reversely and forwardly shifted by the predetermined wavelength respectively to distinguish between the left-eye image and the right-eye image. Then, the third waveband light (a long-wave blue light) is emitted downstream of the first filtering component and the second filtering component, into the optical path of the projector apparatus to complement the blue light waveband which the second waveband lights lacks. Finally, the right-eye image (the second emergent light that is forwardly shifted by the predetermined wavelength) and the left-eye image (the second emergent light that is reversely shifted by the predetermined wavelength) propagate through the light uniformizing component, the optical modulator and the lens set to form a stereoscopic image with complete color information (i.e., the three primary colors).

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An optical module for use in a projector apparatus, the optical module comprising:
    a curved reflecting component, which has a focus, a transmissive portion, a first reflecting portion and a second reflecting portion, and the transmissive portion being disposed on the first reflecting portion;
    a first filtering component;
    a second filtering component disposed at a side of the first filtering component;
    a rolling component, which includes a first transforming portion and a second transforming portion, each of the first transforming portion and the second transforming portion comprising a wavelength transforming unit, and the first transforming portion and the second transforming portion independently passing through the focus in a first period and a second period;
    a reflecting component disposed between the curved reflecting component and the first and the second filtering components; and
    a first collecting component disposed between the reflecting component and the first and the second filtering components,
    wherein, in the first period, a first waveband light transmits into the transmissive portion and then is transformed into a second waveband light via the first transforming portion, and the second waveband light is transformed into a first emergent light via the second reflecting portion and the first filtering component, and in the second period, the first waveband light transmits into the transmissive portion and then is transformed into the second waveband light via the second transforming portion, and the second waveband light is transformed into a second emergent light via the first reflecting portion and the second filtering component.

2. The optical module of claim 1, wherein the second waveband light is reversely shifted by a predetermined wavelength via the first filtering component to form the first emergent light in the first period, and the second waveband light is forwardly shifted by the predetermined wavelength via the second filtering component to form the second emergent light in the second period.

3. The optical module of claim 1, wherein the first transforming portion of the rolling component comprises a first red transforming area, a first green transforming area, a first yellow transforming area and a transmissive area, and the second transforming portion comprises a second red transforming area, a second green transforming area, a second yellow transforming area and a reflecting area.

4. The optical module of claim 1, wherein the optical module further transmits at least one third waveband light along a direction substantially parallel to the first emergent light and the second emergent light.

5. The optical module of claim 1, wherein the curved reflecting component comprises a hyperboloid structure, and the hyperboloid structure is an ellipse structure or a paraboloid structure.

6. The optical module of claim 1, wherein each of the wavelength transforming units comprises a green phosphor, a red phosphor and a yellow phosphor.

7. A projector apparatus comprising:
   at least one first light source for providing a first waveband light;
   at least one second light source for providing a third waveband light;
   an optical module of claim 1 for transforming the second waveband light into the first emergent light reversely shifted by the predetermined wavelength and transforming the second waveband light into the second emergent light forwardly shifted by the predetermined wavelength; and
   a light uniformizing component for uniformizing the third waveband light, the first emergent light and the second emergent light, and for transmitting the first emergent light and the second emergent light via an optical modulator and a lens set in sequence.

8. The projector apparatus of claim 7, wherein the projector apparatus further comprises a second collecting component disposed between the first light source and the curved reflecting component.

9. The projector apparatus of claim 7, further comprising a third collecting component disposed between the light uniformizing component and the first and the second filtering components.

10. The projector apparatus of claim 7, wherein the light uniformizing component is an array lens or a fly lens.

11. The projector apparatus of claim 7, wherein the optical modulator comprises a digital micromirror device (DMD) or a liquid crystal displaying (LCD) device.

12. The projector apparatus of claim 7, wherein the first light source is a short-wave blue light emitter, and the second light source is a long-wave blue light emitter.

* * * * *